US009231907B2

(12) United States Patent
Yoshino et al.

(10) Patent No.: US 9,231,907 B2
(45) Date of Patent: Jan. 5, 2016

(54) METHOD FOR ESTABLISHING CONNECTION BETWEEN COMMUNICATION APPARATUSES, COMMUNICATION APPARATUS, AND SERVER APPARATUS

(75) Inventors: Makoto Yoshino, Osaka (JP); Kazuki Sato, Osaka (JP); Kunio Gobara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 227 days.

(21) Appl. No.: 13/487,505

(22) Filed: Jun. 4, 2012

(65) Prior Publication Data

US 2013/0138824 A1    May 30, 2013

(30) Foreign Application Priority Data

Nov. 28, 2011   (JP) .................................. 2011-258970

(51) Int. Cl.
*G06F 15/16*    (2006.01)
*H04L 29/12*    (2006.01)
(Continued)

(52) U.S. Cl.
CPC .......... *H04L 61/2575* (2013.01); *H04L 67/141* (2013.01); *H04L 61/2514* (2013.01); *H04L 65/1069* (2013.01); *H04L 67/104* (2013.01)

(58) Field of Classification Search
CPC ... H04L 67/14; H04L 67/141; H04L 65/1069; H04L 67/1061; H04L 67/1063; H04L 67/104; G06F 15/16
USPC ........................................................ 709/228
See application file for complete search history.

(56) References Cited

U.S. PATENT DOCUMENTS

| 6,167,440 A | 12/2000 | Hirai |
| 7,239,882 B1 * | 7/2007 | Cook ..................... H04W 16/10 455/416 |
| 7,298,733 B2 * | 11/2007 | Sakai et al. ................... 370/352 |

(Continued)

FOREIGN PATENT DOCUMENTS

| JP | 2-155352 | 6/1990 |
| JP | 10-210181 | 8/1998 |

(Continued)

*Primary Examiner* — Joseph E Avellino
*Assistant Examiner* — Binod J Kunwar
(74) *Attorney, Agent, or Firm* — Wenderoth, Lind & Ponack, L.L.P.

(57) ABSTRACT

A first connection between a first communication apparatus and a server apparatus and a second connection between a second communication apparatus and the server apparatus are established. The first and second communication apparatuses exchange information on their features via the first and second connections, and then, disconnects the first and second connections. The first communication apparatus acquires information on settings of its communication environment, and then, establishes a third connection with the server apparatus. The second communication apparatus acquires information on settings of its communication environment, and then, establishes a fourth connection with the server apparatus. The first and second communication apparatuses exchange the information on the settings of their communication environments via the third and fourth connections. The first and second communication apparatuses establishes a fifth connection between them not through the server apparatus, based on the information on the settings of their communication environments.

7 Claims, 9 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 7,533,141 B2 * | 5/2009 | Nadgir | G06F 9/5072 370/395.1 |
| 7,567,504 B2 * | 7/2009 | Darling et al. | 370/216 |
| 7,647,388 B2 * | 1/2010 | Kato | 709/219 |
| 7,808,906 B2 * | 10/2010 | Rao et al. | 370/235 |
| 7,912,046 B2 * | 3/2011 | Li | H04L 29/12009 370/389 |
| 7,917,632 B2 * | 3/2011 | Lee | H04L 29/08846 709/204 |
| 8,171,147 B1 * | 5/2012 | Kaufman et al. | 709/228 |
| 8,271,664 B2 * | 9/2012 | Lennaerts | 709/228 |
| 8,402,516 B2 * | 3/2013 | Weizman | 726/4 |
| 8,793,313 B2 * | 7/2014 | Kern | H04L 63/0407 709/204 |
| 8,825,907 B2 * | 9/2014 | Nerst | H04L 29/08846 379/220.01 |
| 2002/0174232 A1 * | 11/2002 | Kikuta et al. | 709/227 |
| 2004/0034776 A1 * | 2/2004 | Fernando et al. | 713/171 |
| 2006/0039356 A1 * | 2/2006 | Rao | H04L 1/1854 370/352 |
| 2006/0182111 A1 * | 8/2006 | Wahl | H04L 29/06027 370/392 |
| 2006/0221996 A1 * | 10/2006 | de Froment | H04L 63/0428 370/463 |
| 2008/0034009 A1 * | 2/2008 | Freedman et al. | 707/201 |
| 2008/0215669 A1 * | 9/2008 | Gaddy | H04L 29/12528 709/203 |
| 2010/0023646 A1 * | 1/2010 | Gobara et al. | 709/233 |
| 2010/0057853 A1 * | 3/2010 | Xu et al. | 709/204 |
| 2010/0146126 A1 * | 6/2010 | Lin | H04L 29/12509 709/228 |
| 2010/0198842 A1 * | 8/2010 | Giraudon | G06F 17/30106 707/754 |
| 2010/0274848 A1 * | 10/2010 | Altmaier | H04L 67/104 709/203 |
| 2011/0125910 A1 * | 5/2011 | Sueda et al. | 709/227 |
| 2011/0231478 A1 * | 9/2011 | Wheeler et al. | 709/203 |
| 2011/0250909 A1 * | 10/2011 | Mathias et al. | 455/466 |

FOREIGN PATENT DOCUMENTS

| | | |
|---|---|---|
| JP | 2002-344484 | 11/2002 |
| JP | 2003-169075 | 6/2003 |

* cited by examiner

| DEVICE ID | GLOBAL IP ADDRESS |
|---|---|
| 1234567890123456 | aaa.aaa.aaa.aaa |
| 1234567890123457 | bbb.bbb.bbb.bbb |
| 1234567890123458 | ccc.ccc.ccc.ccc |
| 1234567890123459 | ddd.ddd.ddd.ddd |
| ⋮ | ⋮ |

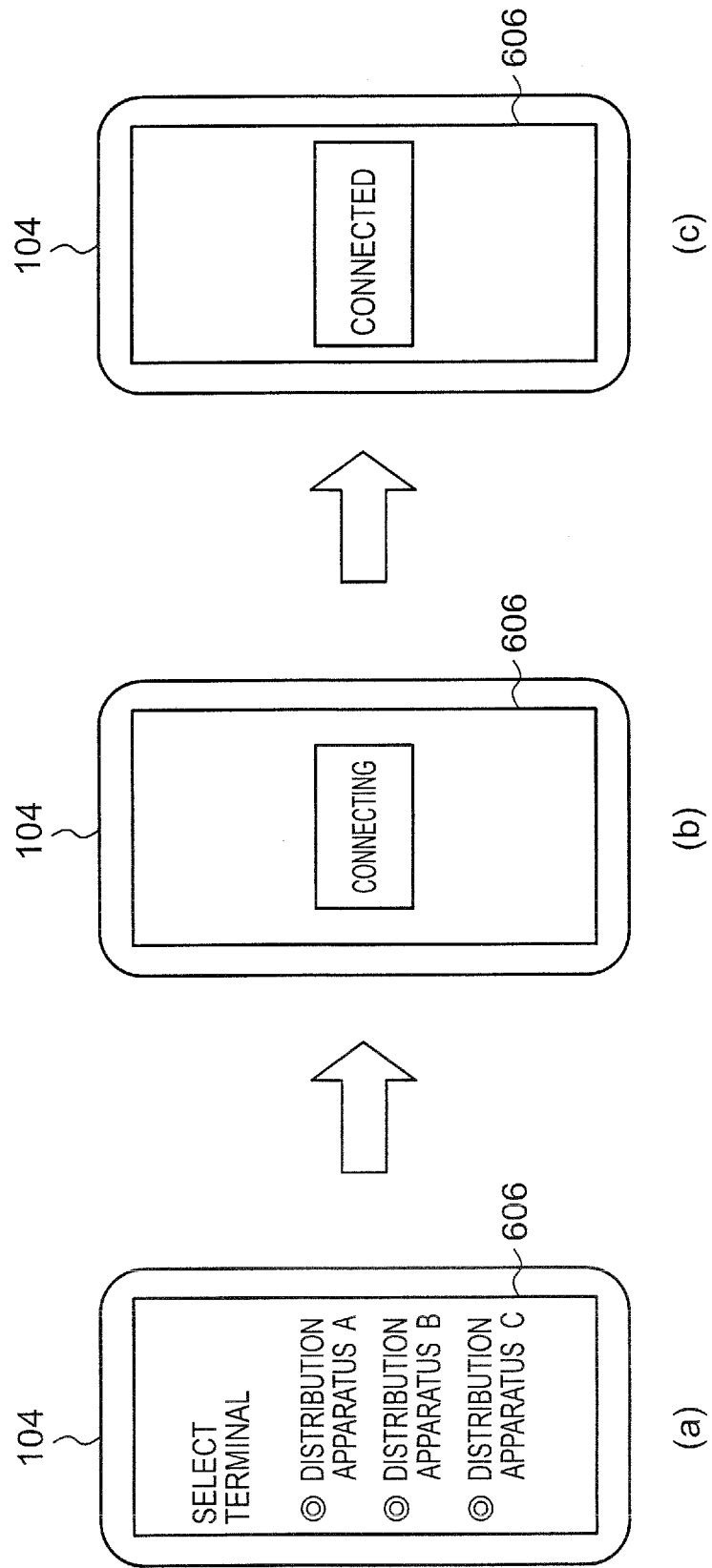

METHOD FOR ESTABLISHING CONNECTION BETWEEN COMMUNICATION APPARATUSES, COMMUNICATION APPARATUS, AND SERVER APPARATUS

BACKGROUND OF THE INVENTION

1. Technical Field

The technical field relates to a method for establishing a connection between communication apparatuses, particularly over a network such as the Internet, and also relates to a communication apparatus and a server apparatus each involved in such a method.

2. Description of the Related Art

Methods for connecting communication apparatuses each connected to the Internet have been known in the art (e.g., see Japanese Patent Laid-open Publication No. 2003-169075). Japanese Patent Laid-open Publication No. 2003-169075 discloses a connection helper server capable of establishing communications between a requesting terminal and an answering terminal. The connection helper server relays data using connections from the answering terminal and requesting terminal associated with each other, for data transmission and reception.

Among methods for establishing a connection between two communication apparatuses, a peer-to-peer (P2P) method is known. According to the peer-to-peer method, it is possible to transmit and receive data directly between communication apparatuses not through a server apparatus. However, according to the peer-to-peer method, the communication apparatuses should exchange their information with each other via the server apparatus before establishing the connection between the communication apparatuses. In other words, the communication apparatuses should communicate with the connection helper server apparatus before establishing the connection between the communication apparatuses.

SUMMARY

As described above, according to methods for transmitting and receiving data directly between communication apparatuses, such as the peer-to-peer method, the communication apparatuses should communicate with a server apparatus before establishing a connection between the communication apparatuses. When each communication apparatus communicates with the server apparatus, a session is held between the communication apparatus and the server apparatus. The session to be held until the connection is established between the communication apparatuses is a load on the server apparatus. In such a case where the communication apparatuses should communicate with the server apparatus when establishing a connection between the communication apparatuses, the more pairs of communication apparatuses try to connect with each other, the more sessions are held between the server apparatus and the respective communication apparatuses. As the result, there arises a problem that a large load is imposed on the server apparatus.

Therefore, one non-limiting and exemplary embodiment solves the above mentioned problem, and provides a method for establishing a connection between communication apparatuses, capable of reducing a load on a server apparatus when establishing a direct connection between two communication apparatuses, and also provide a communication apparatus and a server apparatus each involved in such a method.

In one general aspect, the techniques disclosed here feature: a method for establishing a connection between communication apparatuses, the communication apparatuses including first and second communication apparatuses, and the first and second communication apparatuses communicating with a server apparatus to establish the connection between the first and second communication apparatuses not through the server apparatus. The method includes establishing a first connection from the first communication apparatus to the server apparatus; establishing a second connection between the second communication apparatus and the server apparatus; exchanging information on features of the first and second communication apparatuses between the first and second communication apparatuses via the first and second connections, and disconnecting the first and second connections after exchanging the information on the features of the first and second communication apparatuses. Then, the method further includes acquiring information on settings of a communication environment of the first communication apparatus by the first communication apparatus; establishing a third connection from the first communication apparatus to the server apparatus after acquiring the information on the settings of the communication environment of the first communication apparatus; acquiring information on settings of a communication environment of the second communication apparatus by the second communication apparatus; and establishing a fourth connection from the second communication apparatus to the server apparatus after acquiring the information on the settings of the communication environment of the second communication apparatus. Then, the method further includes exchanging the information on the settings of the communication environments of the first and second communication apparatuses between the first and second communication apparatuses via the third and fourth connections; and establishing a fifth connection between the first and second communication apparatuses not through the server apparatus, based on the exchanged information on the settings of the communication environments of the first and second communication apparatuses.

The above general aspect may be implemented using a system, a method, and a computer program, and any combination of systems, methods, and computer programs.

According to the above general aspect, it is possible to provide a method for establishing a connection between communication apparatuses, capable of reducing a load on a server apparatus when establishing a direct connection between two communication apparatuses. Particularly, according to the configuration described above, it is possible to disconnect the connection between the server apparatus and the communication apparatus during a period in which the connection is not required to be held. Therefore, it is possible to reduce the load on the server apparatus. According to the above general aspect, it is also possible to provide a communication apparatus and a server apparatus each capable of reducing a load on a server apparatus when establishing a direct connection between two communication apparatuses.

Additional benefits and advantages of the disclosed embodiments will be apparent from the specification and drawings. The benefits and/or advantages may be individually provided by the various disclosed embodiments and features of the specification and drawings, and need not all be provided in order to obtain one or more of the same."

BRIEF DESCRIPTION OF THE DRAWINGS

These and other aspects and features will become clear from the following description taken in conjunction with the exemplary embodiments thereof with reference to the accompanying drawings, throughout which like parts are designated by like reference numerals, and in which:

FIG. 5 is a diagram showing a management table 404A of content distribution apparatuses, held by an HDD 404 of the call apparatus 103 of FIG. 1;

FIG. 9 is a diagram showing changes on a display 606 of the mobile terminal apparatus 104 of FIG. 1.

DETAILED DESCRIPTION

The exemplary embodiments according to the present invention will be described below with reference to the attached drawings.

1. Configurations

Figure 1:
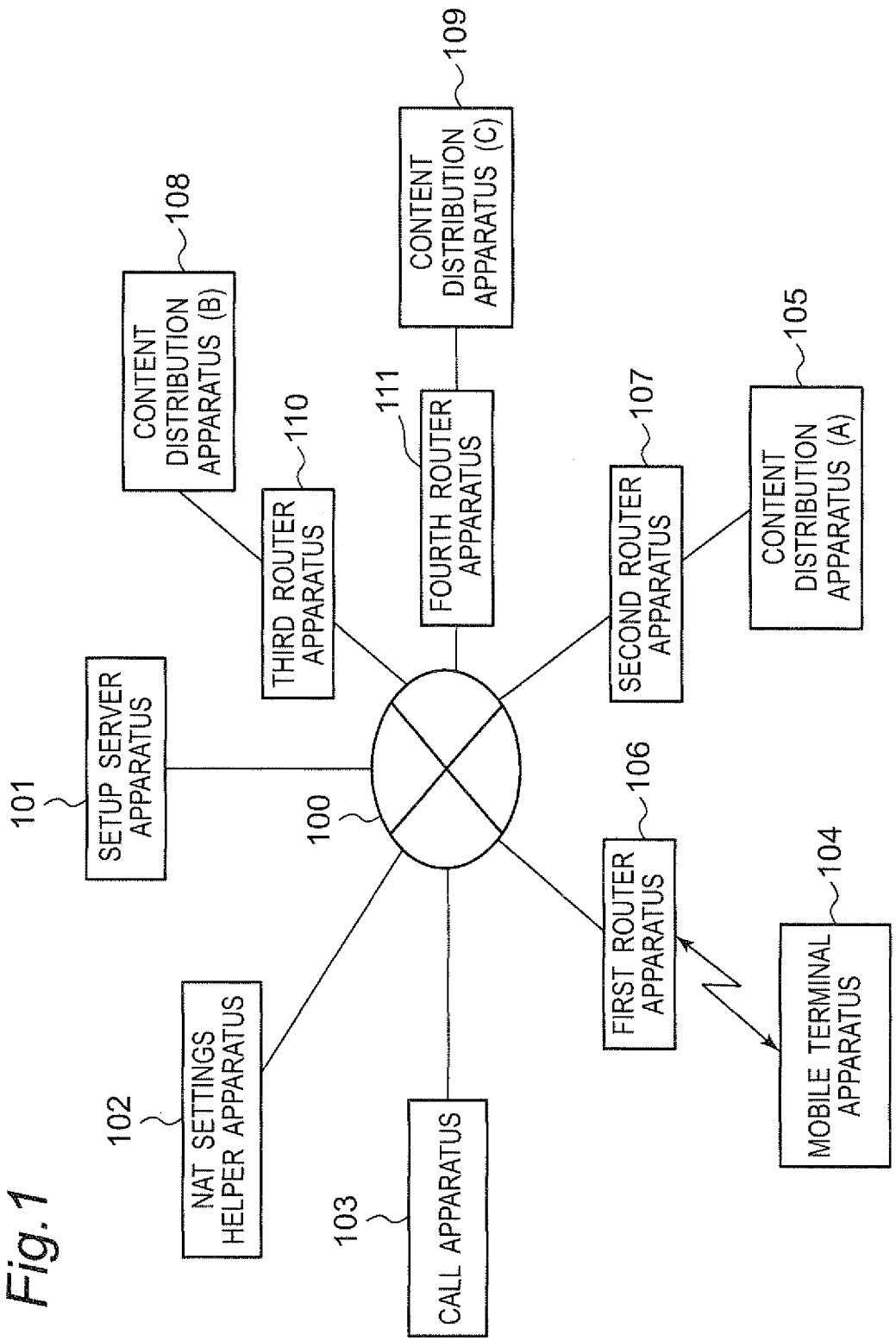
FIG. 1 is a block diagram showing a general configuration of a communication system according to an embodiment of the present invention.

FIG. 1 is a block diagram showing a general configuration of a communication system according to an embodiment of the present invention. The communication system of FIG. 1 includes a setup server apparatus 101, a NAT setting helper apparatus 102, and a call apparatus 103, each connected to the Internet 100. The communication system of FIG. 1 also includes a mobile terminal apparatus 104 connected to the Internet 100 via a first router apparatus 106, a content distribution apparatus 105 connected to the Internet 100 via a second router apparatus 107, a content distribution apparatus 108 connected to the Internet 100 via a third router apparatus 110, and a content distribution apparatus 109 connected to the Internet 100 via a fourth router apparatus 111.

According to the communication system of this embodiment, the mobile terminal apparatus 104 tries to establish a direct connection (a peer-to-peer connection) with one of the content distribution apparatuses 105, 108, and 109. This embodiment indicates the case where the mobile terminal apparatus 104 connects to the content distribution apparatus 105. The communication system of this embodiment establishes the connection between the mobile terminal apparatus 104 and the content distribution apparatus 105 not through the setup server apparatus 101 in such a manner that the mobile terminal apparatus 104 and the content distribution apparatus 105 communicate with the setup server apparatus 101.

Figure 2:
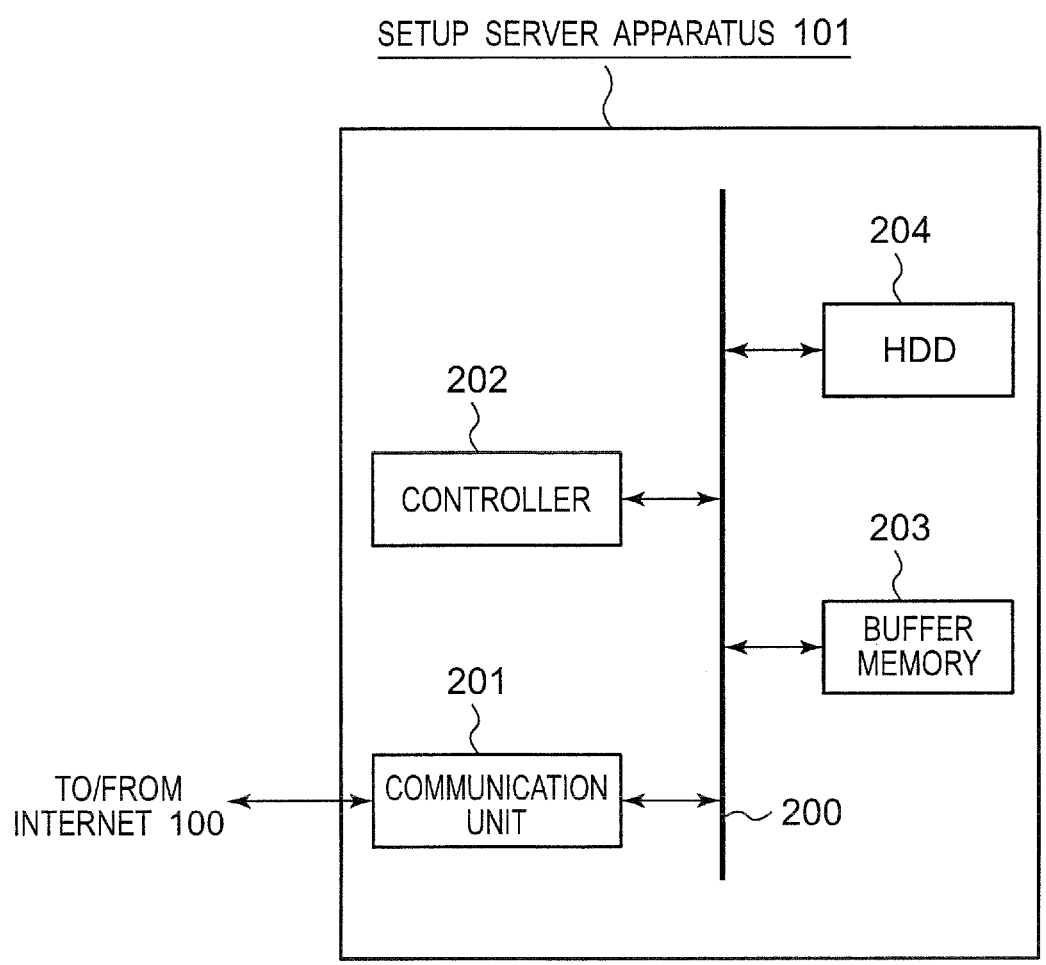
FIG. 2 is a block diagram showing a configuration of a setup server apparatus 101 of FIG. 1.

FIG. 2 is a block diagram showing a configuration of the setup server apparatus 101 of FIG. 1. When the mobile terminal apparatus 104 tries to establish a direct connection with the content distribution apparatus 105, the setup server apparatus 101 helps them to establish this connection. The setup server apparatus 101 includes a communication unit 201, a controller 202, a buffer memory 203, and an HDD (Hard Disk Drive) 204, and these components are mutually connected by a bus 200. The communication unit 201 is, e.g., a network interface card. Preferably, the communication unit 201 is connected to the Internet 100 via a local area network and a gateway apparatus (not shown). The controller 202 includes, e.g., a CPU (Central Processing Unit), and executes steps of a sequence described later with reference to FIG. 8, in accordance with a program stored in the HDD 204. The HDD 204 may be any other nonvolatile memory device, such as a flash memory.

The controller 202 of the setup server apparatus 101 communicates with the mobile terminal apparatus 104 and the content distribution apparatus 105 through the communication unit 201. In addition, when the communication unit 201 receives a connection request message from the mobile terminal apparatus 104 to the content distribution apparatus 105, the controller 202 transmits a call request message to the call apparatus 103 through the communication unit 201 in order to call the content distribution apparatus 105 (the details will be described later). The controller 202 stores the data received by the communication unit 201, in the buffer memory 203 or the HDD 204, according to necessity.

Figure 3:
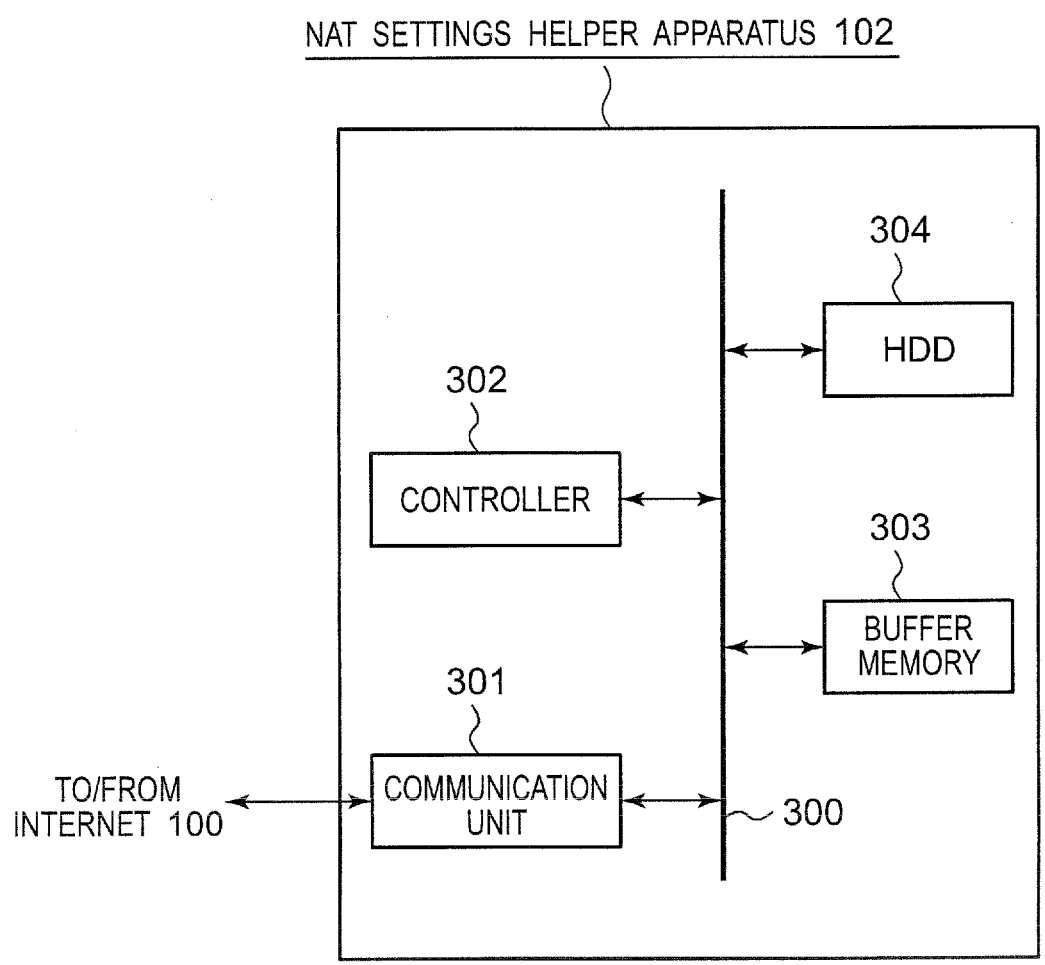
FIG. 3 is a block diagram showing a configuration of a NAT setting helper apparatus 102 of FIG. 1.

FIG. 3 is a block diagram showing a configuration of the NAT setting helper apparatus 102 of FIG. 1. The NAT setting helper apparatus 102 communicates with the mobile terminal apparatus 104 to help the router apparatus 106 to set its network address translation (NAT), and similarly, communicates with the content distribution apparatus 105 to help the router apparatus 107 to set its NAT (the details will be described later). The NAT setting helper apparatus 102 includes a communication unit 301, a controller 302, a buffer memory 303, and an HDD 304, and these components are mutually connected by a bus 300. The communication unit 301 is, e.g., a network interface card. Preferably, the communication unit 301 is connected to the Internet 100 via a local area network and a gateway apparatus (not shown). The controller 302 includes, e.g., a CPU, and executes steps of helping the router apparatuses 106 and 107 to set their NAT, in accordance with a program stored in the HDD 304. The HDD 304 may be any other nonvolatile memory device, such as a flash memory.

The controller 302 of the NAT setting helper apparatus 102 communicates with the mobile terminal apparatus 104 and the content distribution apparatus 105 (and the router apparatuses 106 and 107 connected thereto) through the communication unit 301. The controller 302 stores the data received by the communication unit 301, in the buffer memory 303 or the HDD 304, according to necessity.

Figure 4:
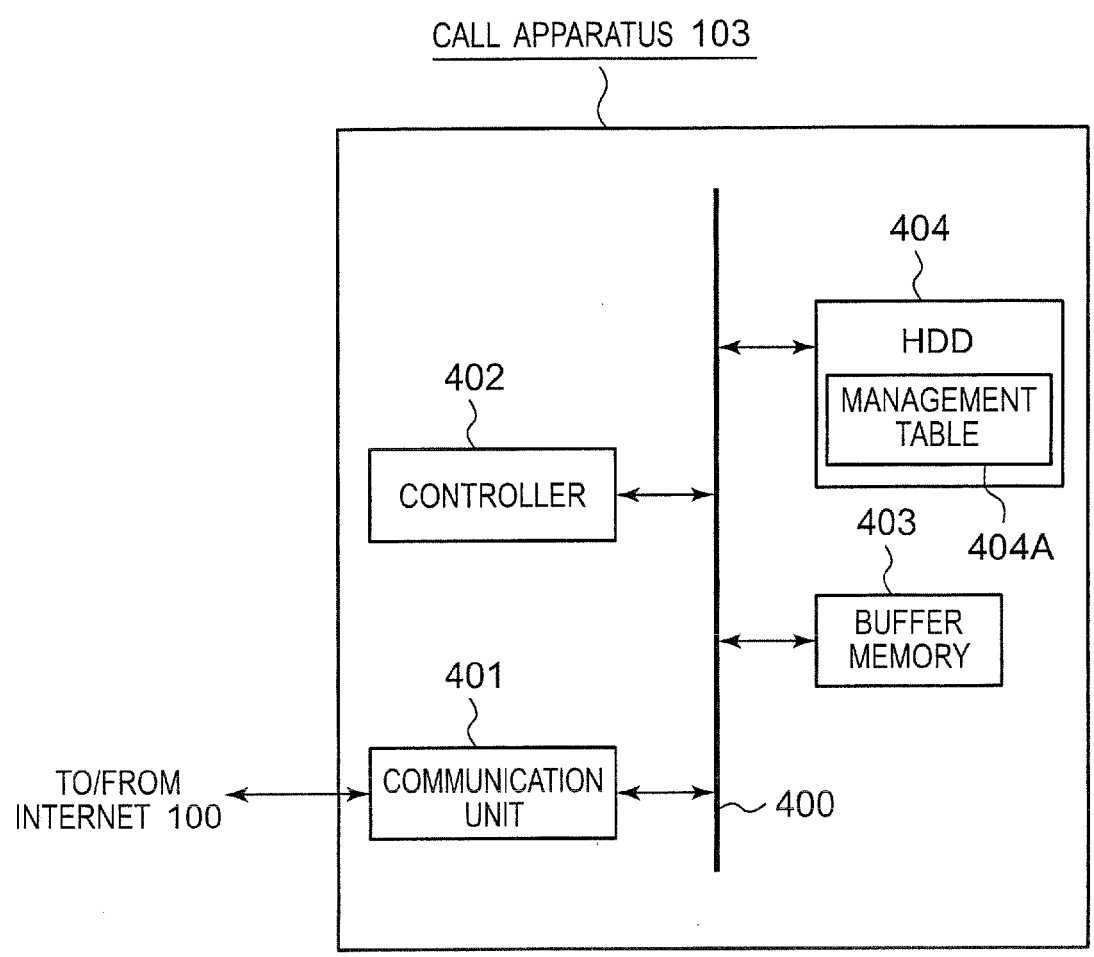
FIG. 4 is a block diagram showing a configuration of a call apparatus 103 of FIG. 1.

FIG. 4 is a block diagram showing a configuration of the call apparatus 103 of FIG. 1. The call apparatus 103 manages device IDs and global IP addresses of content distribution apparatuses each connected to the Internet 100 and being active. The state that a content distribution apparatus is "active" indicates a state that the content distribution apparatus can communicate with other communication apparatuses (e.g., the call apparatus 103 and the mobile terminal apparatus 104) connected to the Internet 100. The setup server apparatus 101 does not know global IP addresses of the content distribution apparatuses 105, 108, and 109. Therefore, when the mobile terminal apparatus 104 tries to establish a direct connection with the content distribution apparatus 105, the setup server apparatus 101 transmits a call request to the call apparatus 103 (the details will be described later). The call apparatus 103 includes a communication unit 401, a controller 402, a buffer memory 403, and an HDD 404, and these components are mutually connected by a bus 400. The communication unit 401 is, e.g., a network interface card. Preferably, the communication unit 401 is connected to the Internet 100 via a local area network and a gateway apparatus (not shown). The controller 402 includes, e.g., a CPU, and executes steps of managing device IDs and global IP addresses of active content distribution apparatuses, and executes steps of the sequence described later with reference to FIG. 8, in accordance with a program stored in the HDD 404. The HDD 404 holds a management table 404A containing device IDs and global IP addresses of active content distribution apparatuses. The HDD 404 may be any other nonvolatile memory device, such as a flash memory.

The call apparatus 103 receives a notification message at the communication unit 401 from each of the content distribution apparatuses 105, 108, and 109, the notification message indicating that the content distribution apparatus is active. At this time, the controller 402 assigns a unique device ID to the content distribution apparatus, reads an originating global IP address from the received notification message, and records the pair of the device ID and the global IP address on the management table 404A. FIG. 5 is a diagram showing the management table 404A of content distribution apparatuses, held by the HDD 404 of the call apparatus 103 of FIG. 1. A set of content distribution apparatuses each connected to the Internet 100 and being active may change over time. Therefore, the call apparatus 103 regularly polls the content distribution apparatuses managed, and updates the management table 404A when the members of the set of content distribution apparatuses change. Further, the controller 402 communicates with the setup server apparatus 101 through the communication unit 401. When receiving a call request message from the setup server apparatus 101, the controller 402 transmits a call message to the content distribution apparatus 105 (the details will be described later).

Figure 6:
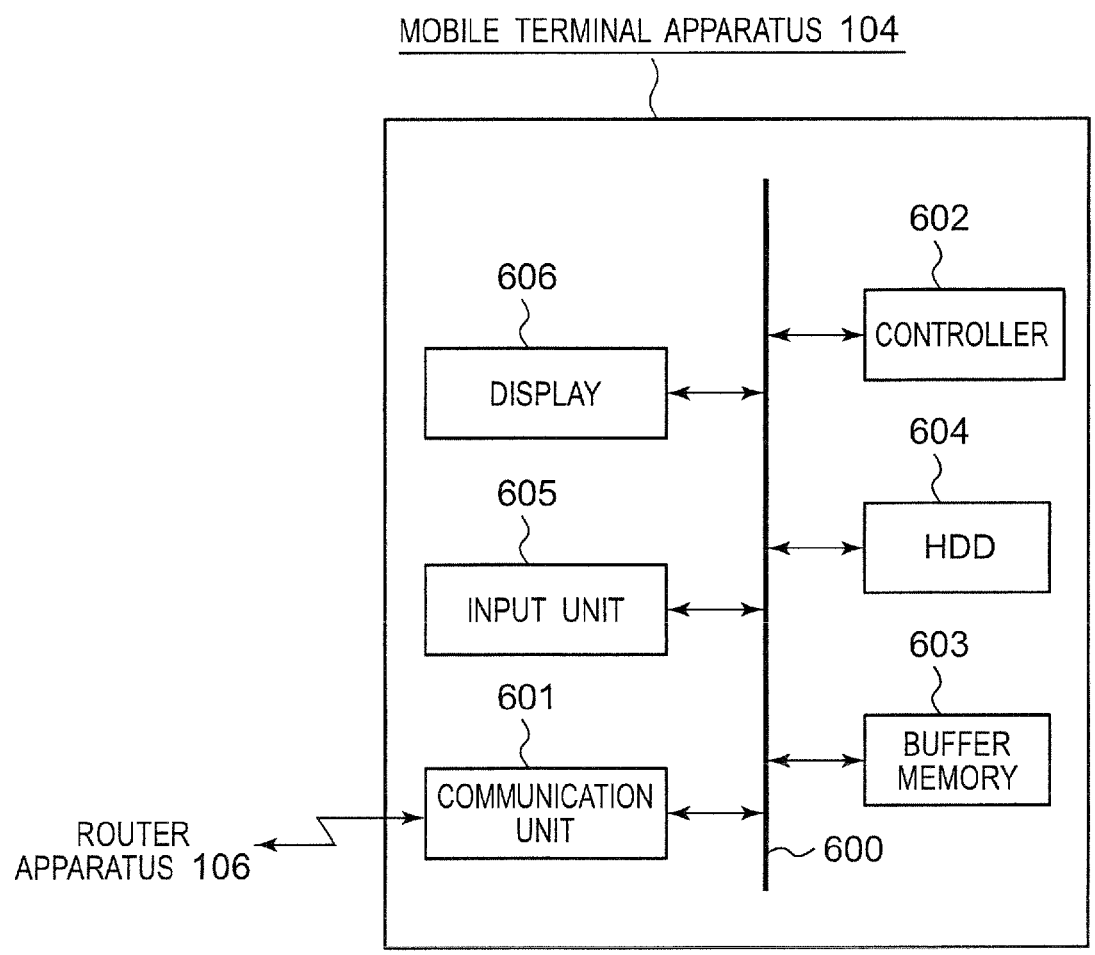
FIG. 6 is a block diagram showing a configuration of a mobile terminal apparatus 104 of FIG. 1.

FIG. 6 is a block diagram showing a configuration of the mobile terminal apparatus 104 of FIG. 1. The mobile terminal apparatus 104 includes a communication unit 601, a controller 602, a buffer memory 603, an HDD 604, an input unit 605, and a display 606, and these components are mutually connected by a bus 600. The communication unit 601 is, e.g., a wireless network interface card, or a communication circuit for mobile telephone line, and is connected to the router apparatus 106 over the air. The communication unit 601 may be a network interface card for a wired connection with the router apparatus 106. The controller 602 includes, e.g., a CPU, and executes steps of the sequence described later with reference to FIG. 8, in accordance with a program stored in the HDD 604. The HDD 604 may be any other nonvolatile memory device, such as a flash memory. The input unit 605 is, e.g., a physical key or a touch panel.

The controller 602 of the mobile terminal apparatus 104 communicates with the setup server apparatus 101, the NAT setting helper apparatus 102, and the content distribution apparatus 105, through the communication unit 601. A user of the mobile terminal apparatus 104 instructs the controller 602 to establish a connection with the content distribution apparatus 105, using the input unit 605. The controller 602 stores results of communication (containing contents of all received data and a record of errors) in the HDD 604. In addition, the controller 602 performs communications for desired operations using the established connection between the mobile terminal apparatus 104 and the content distribution apparatus 105, and indicates a status and a result of the process on the display 606.

Figure 7:
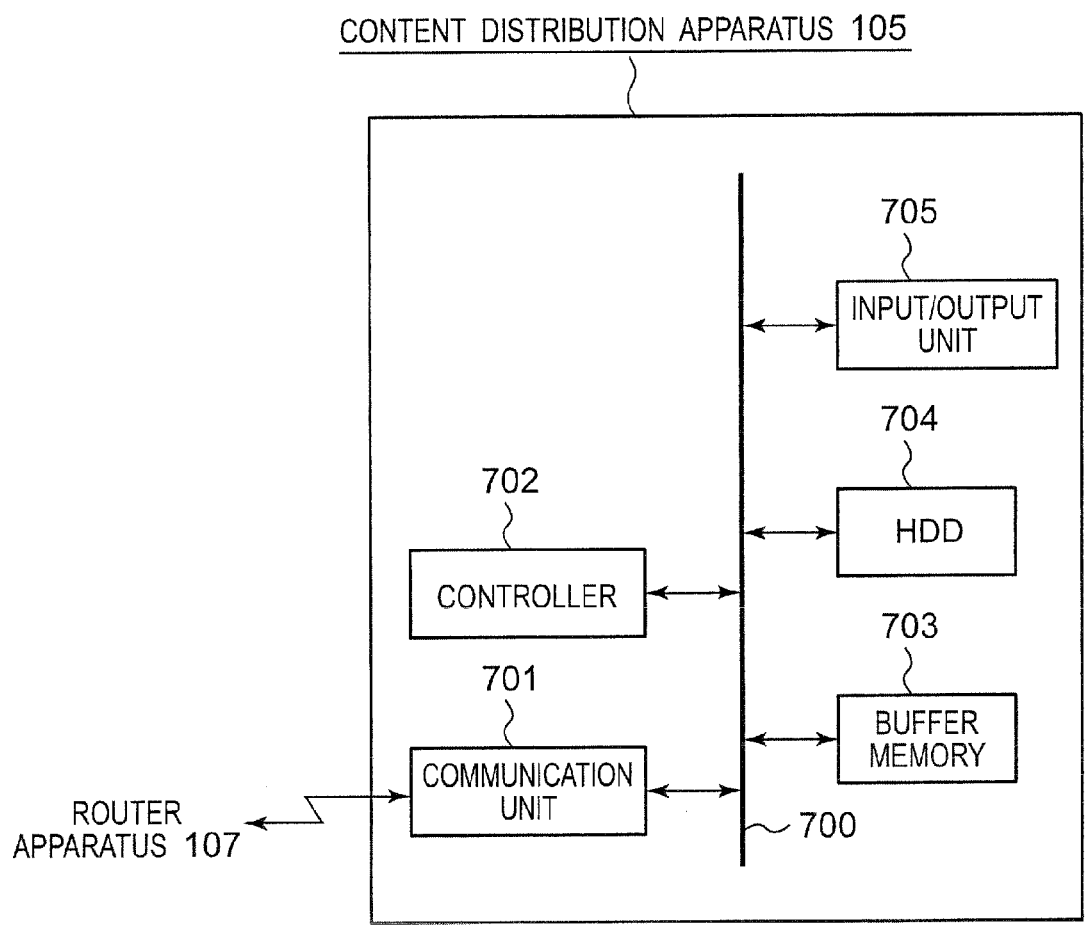
FIG. 7 is a block diagram showing a configuration of a content distribution apparatus 105 of FIG. 1.

FIG. 7 is a block diagram showing a configuration of the content distribution apparatus 105 of FIG. 1. The content distribution apparatus 105 allows, e.g., the upload of content data from the mobile terminal apparatus 104, or the download of content data to the mobile terminal apparatus 104. The content distribution apparatus 105 includes a communication unit 701, a controller 702, a buffer memory 703, an HDD 704, and an input/output unit 705, and these components are mutually connected by a bus 700. The communication unit 701 is, e.g., a network interface card, and is connected to the router apparatus 107 through a wired connection. The controller 702 includes, e.g., a CPU, and executes steps of the sequence described later with reference to FIG. 8, in accordance with a program stored in the HDD 704. The HDD 704 may be any other nonvolatile memory device, such as a flash memory. The input/output unit 705 is, e.g., an HDMI interface circuit.

The controller 702 of the content distribution apparatus 105 communicates with the setup server apparatus 101, the NAT setting helper apparatus 102, the call apparatus 103, and the mobile terminal apparatus 104. The controller 702 stores results of communication (containing contents of all received data and a record of errors) in the HDD 704. In addition, the controller 702 performs communications for desired operations using the established connection between the mobile terminal apparatus 104 and the content distribution apparatus 105, and indicates a status and a result of the operation on an external display apparatus (not shown) connected through the input/output unit 705.

Each of the content distribution apparatuses 108 and 109 is configured in a similar manner as that of the content distribution apparatus 105.

2. Operations

Next, operations for establishing a peer-to-peer connection between the mobile terminal apparatus 104 and the content distribution apparatus 105 of FIG. 1 will be described with reference to FIG. 8.

Figure 8:
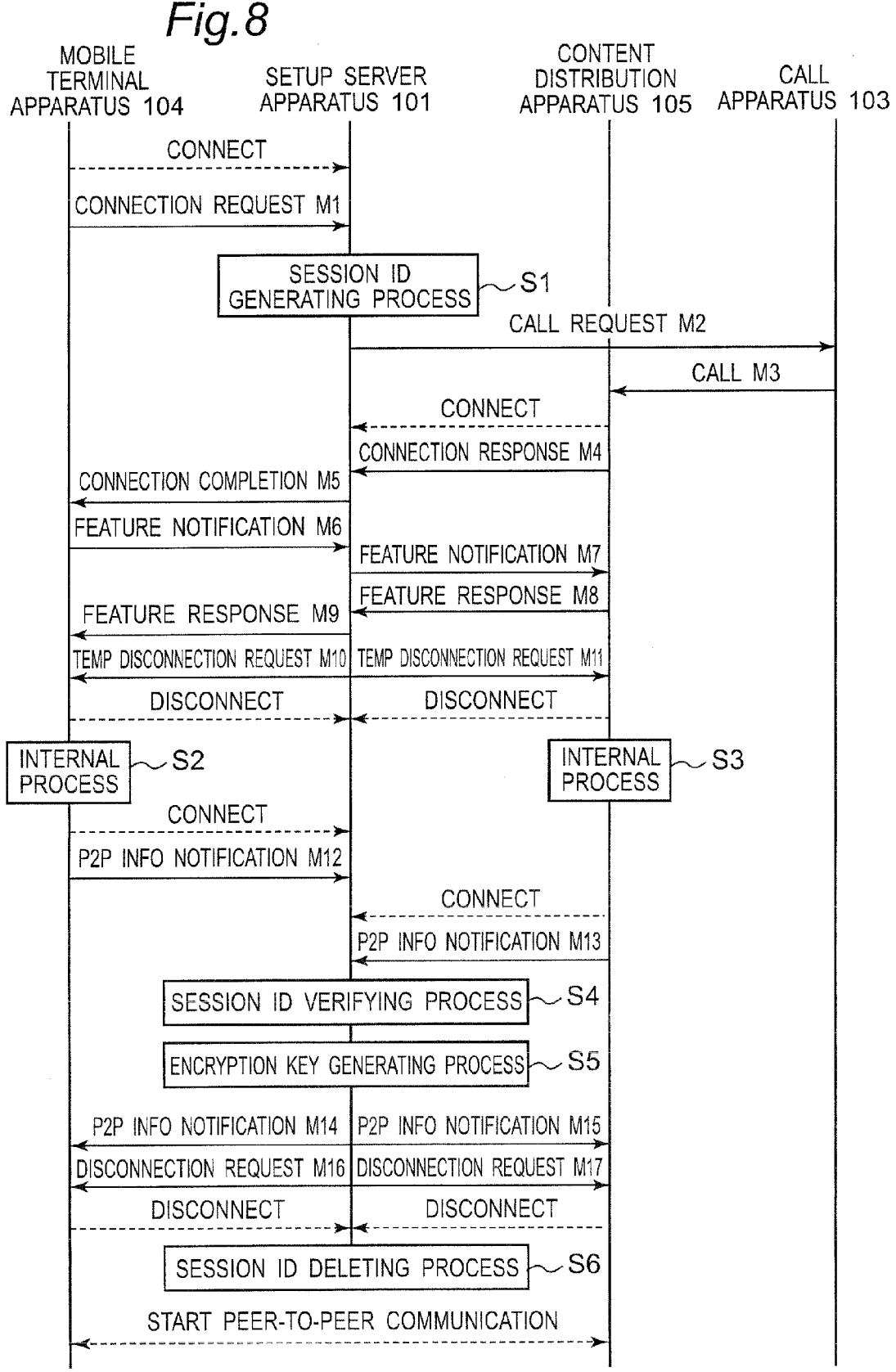
FIG. 8 is a sequence diagram for establishing a peer-to-peer connection between the mobile terminal apparatus 104 and the content distribution apparatus 105 of FIG. 1.

FIG. 8 is a sequence diagram for establishing the peer-to-peer connection between the mobile terminal apparatus 104 and the content distribution apparatus 105 of FIG. 1. FIG. 9 is a diagram showing changes on the display 606 of the mobile terminal apparatus 104 of FIG. 1.

In advance, the controller 602 of the mobile terminal apparatus 104 acquires the device IDs of the content distribution apparatuses 105, 108, and 109, each of which is a candidate with which the mobile terminal apparatus 104 may connect. The controller 602 indicates on the display 606 the content distribution apparatuses 105, 108, and 109, each of which is a candidate with which the mobile terminal apparatus 104 may connect (see FIG. 9(a)). It is assumed that the distribution apparatuses A, B and C shown in FIG. 9(a) correspond to the content distribution apparatuses 105, 108, and 109 of FIG. 1, respectively. The user of the mobile terminal apparatus 104 selects the content distribution apparatus 105 using the input unit 605, and then, a signal indicating the result of selection is sent to the controller 602.

The controller 602 of the mobile terminal apparatus 104 establishes a connection between the mobile terminal apparatus 104 and the setup server apparatus 101 using the communication unit 601 (a first connection). Next, the controller 602 transmits a connection request message M1 to the setup server apparatus 101 through the communication unit 601, the connection request message M1 requesting to establish a connection between the mobile terminal apparatus 104 and the content distribution apparatus 105. The connection request message M1 contains information of the mobile terminal apparatus 104 and information of the content distribution apparatus 105 (a device ID of a target apparatus) with which the mobile terminal apparatus 104 tries to connect. At this time, the controller 602 indicates "CONNECTING" on the display 606 as shown in FIG. 9(b).

The setup server apparatus 101 receives the connection request message M1 at the communication unit 201. The controller 202 stores the information contained in the connection request message M1, in the buffer memory 203. In addition, when receiving the connection request message M1, the controller 202 executes a session ID generating process S1 to generate a session ID to be used for communications among the setup server apparatus 101, the mobile terminal apparatus 104, and the content distribution apparatus 105 until a peer-to-peer connection is established finally. The controller 202 stores the session ID in the buffer memory 203 or the HDD 204. Thereafter, the controller 202 inserts the session ID to messages to be transmitted to the mobile terminal apparatus 104 and the content distribution apparatus 105. The controller 202 prepares a call request message M2 containing the information of the content distribution apparatus 105 (the device ID) stored in the buffer memory 203, and containing the session ID. The controller 202 transmits the call request message M2 to the call apparatus 103 through the communication unit 201.

The call apparatus 103 receives the call request message M2 at the communication unit 401. The controller 402 determines whether or not the device ID of the content distribution apparatus 105, which is contained in the call request message M2, is present in the management table 404A of the HDD 404. If the device ID is present, the controller 402 prepares a call message M3 for calling the content distribution apparatus 105. The call message M3 contains the device ID of the content distribution apparatus 105 and the session ID contained in the call request message M2, and contains an instruction for the content distribution apparatus 105 connect to the setup server apparatus 101. Then, the controller 402 transmits the call message M3 to the content distribution apparatus 105 through the communication unit 401.

The content distribution apparatus 105 receives the call message M3 at the communication unit 701. The controller 702 stores the session ID contained in the call message M3, in the buffer memory 703 or the HDD 704. Thereafter, the controller 702 inserts the session ID to messages to be transmitted to the setup server apparatus 101. The controller 702 establishes a connection between the content distribution apparatus 105 and the setup server apparatus 101 using the communication unit 701 (a second connection). Next, the controller 702 prepares a connection response message M4 containing the information of the content distribution apparatus 105 (the device ID). The controller 702 transmits the connection response message M4 to the setup server apparatus 101 through the communication unit 701.

The setup server apparatus 101 receives the connection response message M4 at the communication unit 201. The controller 202 reads the device ID of the content distribution apparatus 105 from the connection response message M4, and determines whether or not the device ID of the newly connected content distribution apparatus 105 is identical to the device ID of the content distribution apparatus 105 previously stored in the buffer memory 203, with which the mobile terminal apparatus 104 tries to connect. When the device IDs are identical to each other, the controller 202 transmits a connection completion message M5 to the mobile terminal apparatus 104 through the communication unit 201.

The mobile terminal apparatus 104 receives the connection completion message M5 at the communication unit 601. The connection completion message M5 contains the session ID, and the controller 602 stores the session ID contained in the connection completion message M5, in the buffer memory 603 or the HDD 604. Thereafter, the controller 602 inserts the session ID to messages to be transmitted to the setup server apparatus 101.

The controller 602 of the mobile terminal apparatus 104 transmits a feature notification message M6 of the mobile terminal apparatus 104 to the setup server apparatus 101 through the communication unit 601. The feature notification message M6 contains information on features of the mobile terminal apparatus 104, such as information on peer-to-peer communication protocols and encryption algorithms available to the mobile terminal apparatus 104. The feature notification message M6 is transmitted for determining a peer-to-peer communication protocol and an encryption algorithm available to both the mobile terminal apparatus 104 and the content distribution apparatus 105.

The setup server apparatus 101 receives the feature notification message M6 of the mobile terminal apparatus 104 at the communication unit 201. The controller 202 transmits a feature notification message M7 to the content distribution apparatus 105 through the communication unit 201, the feature notification message M7 containing the information contained in the feature notification message M6 as it is.

The content distribution apparatus 105 receives the feature notification message M7 at the communication unit 701. The controller 702 stores the information of the feature notification message M7 (the peer-to-peer communication protocols and the encryption algorithms available to the mobile terminal apparatus 104) in the HDD 704. The controller 702 selects one peer-to-peer communication protocol and one encryption algorithm available to the content distribution apparatus 105, from the information of the feature notification message M7, i.e., from the peer-to-peer communication protocols and the encryption algorithms available to the mobile terminal apparatus 104. Then, the controller 702 prepares a feature response message M8 containing the information on the selected peer-to-peer communication protocol and encryption algorithm (information on features of the content distribution apparatus 105). The controller 702 transmits the feature response message M8 to the setup server apparatus 101 through the communication unit 701.

The setup server apparatus 101 receives the feature response message M8 at the communication unit 201. The controller 202 transmits a feature response message M9 to the mobile terminal apparatus 104 through the communication unit 201, the feature response message M9 containing the information contained in the feature response message M8 as it is.

The mobile terminal apparatus 104 receives the feature response message M9 at the communication unit 601. The controller 602 stores the information of the feature response message M9 (one peer-to-peer communication protocol and one encryption algorithm available to the content distribution apparatus 105) in the HDD 604.

After transmitting the feature response message M9, the controller 202 of the setup server apparatus 101 transmits temporary disconnection request (TEMP DISCONNECTION REQUEST) messages M10 and M11 to the mobile terminal apparatus 104 and the content distribution apparatus 105, respectively, through the communication unit 201.

The mobile terminal apparatus 104 receives the temporary disconnection request message M10 at the communication unit 601. At this time, the controller 602 of the mobile terminal apparatus 104 temporarily disconnects the connection between the mobile terminal apparatus 104 and the setup server apparatus 101 using the communication unit 601. Similarly, the content distribution apparatus 105 receives the temporary disconnection request message M11 at the communication unit 701. At this time, the controller 702 of the content distribution apparatus 105 temporarily disconnects the connection between the content distribution apparatus 105 and the setup server apparatus 101 using the communication unit 701.

Thereafter, in the state that the connection between the mobile terminal apparatus 104 and the setup server apparatus 101 is disconnected, the controller 602 of the mobile terminal apparatus 104 executes an internal process S2 of the mobile terminal apparatus 104. Similarly, in the state that the connection between the content distribution apparatus 105 and the setup server apparatus 101 is disconnected, the controller 702 of the content distribution apparatus 105 executes an internal process S3 of the content distribution apparatus 105. The internal processes S2 and S3 are operations which are executed by the mobile terminal apparatus 104 and the content distribution apparatus 105, respectively, and which are irrelevant to the setup server apparatus 101, and each of which requires a relatively longer time as compared to a time required for transmitting and receiving the respective messages and a time required for the other steps in the sequence diagram shown in FIG. 8. As one example of the internal processes S2 and S3, this embodiment includes steps of setting communication environments of the mobile terminal apparatus 104 and the content distribution apparatus 105, and acquiring information on the settings. More specifically, NAT of the router apparatuses 106 and 107 are set in the internal processes S2 and S3, respectively. In this embodiment, each of the mobile terminal apparatus 104 and the content distribution apparatus 105 communicates with the NAT setting helper apparatus 102 to set the NAT of the router apparatuses 106 and 107.

The process of setting the NAT of the router apparatuses 106 and 107 includes: opening ports of the router apparatuses 106 and 107, waiting for a packet timeout, etc. As the result, this process may require a very long time. In addition, when a plurality of router apparatuses are provided on communication paths from the mobile terminal apparatus 104 and the setup server apparatus 101 to the Internet 100, a much more time may be required.

In the internal process S2, the controller 602 of the mobile terminal apparatus 104 transmits a predetermined packet to the NAT setting helper apparatus 102 through the communication unit 601. The transmitted packet passes through the first router apparatus 106, and is received at the communication unit 301 of the NAT setting helper apparatus 102. The controller 302 of the NAT setting helper apparatus 102 prepares information on NAT of the router apparatus 106, based on the received packet. The information on the NAT of the router apparatus 106 contains a port number opened at the router apparatus 106 when the packet is transmitted from the mobile terminal apparatus 104 to the NAT setting helper apparatus 102. The controller 302 transmits the information on the NAT of the router apparatus 106 to the mobile terminal apparatus 104 through the communication unit 301. The mobile terminal apparatus 104 receives the information on the NAT of the router apparatus 106 at the communication unit 601. The controller 602 of the mobile terminal apparatus 104 predicts a port mapping method for the NAT of the router apparatus 106, based on the information on the NAT of the router apparatus 106.

When completing the internal process S2 of the mobile terminal apparatus 104, the controller 602 of the mobile terminal apparatus 104 establishes a connection between the mobile terminal apparatus 104 and the setup server apparatus 101 using the communication unit 601 (a reconnection, or a third connection). The controller 602 transmits a peer-to-peer information notification (P2P INFO NOTIFICATION) message M12 to the setup server apparatus 101 through the communication unit 601, the peer-to-peer information notification message M12 containing a predicted port number of the router apparatus 106, a virtual IP address of the mobile terminal apparatus 104, and a session ID. The virtual IP address is an address used for a peer-to-peer communication to be established later.

In the internal process S3, the controller 702 of the content distribution apparatus 105 transmits a predetermined packet to the NAT setting helper apparatus 102 through the communication unit 701. The transmitted packet passes through the second router apparatus 107, and is received at the communication unit 301 of the NAT setting helper apparatus 102. The controller 302 of the NAT setting helper apparatus 102 prepares information on NAT of the router apparatus 107, based on the received packet. The information on the NAT of the router apparatus 107 contains a port number opened at the router apparatus 107 when the packet is transmitted from the content distribution apparatus 105 to the NAT setting helper apparatus 102. The controller 302 transmits the information on the NAT of the router apparatus 107 to the content distribution apparatus 105 through the communication unit 301. The content distribution apparatus 105 receives the information on the NAT of the router apparatus 107 at the communication unit 701. The controller 702 of the content distribution apparatus 105 predicts a port mapping method for the NAT of the router apparatus 107, based on the information on the NAT of the router apparatus 107.

When completing the internal process S3 of the content distribution apparatus 105, the controller 702 of the content distribution apparatus 105 establishes a connection between the content distribution apparatus 105 and the setup server apparatus 101 using the communication unit 701 (a reconnection, or a fourth connection). The controller 702 transmits a peer-to-peer information notification message M13 to the setup server apparatus 101 through the communication unit 701, the peer-to-peer information notification message M13 containing a predicted port number of the router apparatus 107, a virtual IP address of the content distribution apparatus 105, and a session ID. The virtual IP address is an address used for the peer-to-peer communication to be established later.

Since the time required for the internal process S2 may be different from that required for the internal process S3, the reconnection between the mobile terminal apparatus 104 and the setup server apparatus 101 may be established at a different time as that of the reconnection between the content distribution apparatus 105 and the setup server apparatus 101.

The setup server apparatus 101 receives the peer-to-peer information notification messages M12 and M13 at the communication unit 201. When receiving both the peer-to-peer information notification messages M12 and M13, the controller 202 executes a session ID verifying process S4. In the session ID verifying process S4, the controller 202 verifies the session ID stored in the buffer memory 203 or the HDD 204, the session ID contained in the peer-to-peer information notification message M12, and the session ID contained in the peer-to-peer information notification message M13, and determines whether or not the origination of the peer-to-peer information notification message M12 is identical to the mobile terminal apparatus 104 as the origination of the connection request message M1, and whether or not the origination of the peer-to-peer information notification message M13 is identical to the content distribution apparatus 105 indicated in the connection request message M1 as the target apparatus with which the mobile terminal apparatus 104 connects. When both the originations are identical to each other, the communication is continued.

Next, the controller 202 of the setup server apparatus 101 executes an encryption key generating process S5 for generating an encryption key to be used for the peer-to-peer communication to be established later. The encryption key is generated based on the encryption algorithm available to the mobile terminal apparatus 104 and the content distribution apparatus 105, which is indicated in the feature response message M8.

After executing the encryption key generating process S5, the controller 202 of the setup server apparatus 101 transmits peer-to-peer information notification messages M14 and M15 to the mobile terminal apparatus 104 and the content distribution apparatus 105, respectively, through the communication unit 201. The peer-to-peer information notification message M14 contains the predicted port number of the router apparatus 107 and the virtual IP address of the content distribution apparatus 105, which are contained in the peer-to-peer information notification message M13, and contains the encryption key. The Deer-to-Deer information notification message M15 contains the predicted port number of the router apparatus 106 and the virtual IP address of the mobile terminal apparatus 104, which are contained in the peer-to-peer information notification message M12, and contains the encryption key. When an error occur at the session ID verifying process S4, the encryption key generating process S5, or any other processes, the peer-to-peer information notifications M14 and M15 contain error codes instead of the information described above.

The mobile terminal apparatus 104 receives the peer-to-peer information notification message M14 at the communication unit 601. The controller 602 stores the information of the peer-to-peer information notification message M14 in the HDD 604. Similarly, the content distribution apparatus 105 receives the peer-to-peer information notification message M15 at the communication unit 701. The controller 702 stores the information of the peer-to-peer information notification message M15 in the HDD 704.

Next, the controller 202 of the setup server apparatus 101 transmits disconnection request messages M16 and M17 to the mobile terminal apparatus 104 and the content distribution apparatus 105, respectively, through the communication unit 201.

The mobile terminal apparatus 104 receives the disconnection request message M16 at the communication unit 601. At this time, the controller 602 disconnects the connection between the mobile terminal apparatus 104 and the setup server apparatus 101 using the communication unit 601. Similarly, the content distribution apparatus 105 receives the disconnection request message M17 at the communication unit 701. At this time, the controller 702 disconnects the connection between the content distribution apparatus 105 and the setup server apparatus 101 using the communication unit 701.

After disconnecting the connections with the mobile terminal apparatus 104 and the content distribution apparatus 105, the controller 202 of the setup server apparatus 101 executes a session ID deleting process S6 for deleting the session ID stored in the buffer memory 203 or the HDD 204.

After disconnecting the connections with the setup server apparatus 101, the mobile terminal apparatus 104 and the content distribution apparatus 105 start a peer-to-peer communication between the mobile terminal apparatus 104 and the content distribution apparatus 105 using the predicted port numbers of the router apparatuses 106 and 107, the virtual IP addresses, and the encryption key (a fifth connection). At this time, the display 606 indicates "CONNECTED" as shown in FIG. 9(c).

3. Conclusion

The operations of the communication system of this embodiment are summarized as follows. According to the communication system of this embodiment, the mobile terminal apparatus 104 and the content distribution apparatus 105 communicate with the setup server apparatus 101 to exchange information on the features of the mobile terminal apparatus 104 and the content distribution apparatus 105 with each other. When receiving the temporary disconnection request messages M10 and M11 from the setup server apparatus 101, the mobile terminal apparatus 104 and the content distribution apparatus 105 temporarily disconnect the connections with the setup server apparatus 101, respectively. In the state that the connections with the setup server apparatus 101 are disconnected, the mobile terminal apparatus 104 executes the internal process S2, and the content distribution apparatus 105 executes the internal process S3. After executing the internal processes S2 and S3, the mobile terminal apparatus 104 and the content distribution apparatus 105 reconnect with the setup server apparatus 101, respectively, to exchange the communication environment setting information of the mobile terminal apparatus 104 and the content distribution apparatus 105 with each other. Accordingly, the connection between the mobile terminal apparatus 104 and the setup server apparatus 101 and the connection between the content distribution apparatus 105 and the setup server apparatus 101 are disconnected when executing the internal processes S2 and S3. Thus, when exchanging the information required for establishing the connection between the mobile terminal apparatus 104 and the content distribution apparatus 105 not through the setup server apparatus 101, it is not necessary to keep the connection between the mobile terminal apparatus 104 and the setup server apparatus 101 and the connection between the content distribution apparatus 105 and the setup server apparatus 101. As the result, it is possible to reduce a load on the setup server apparatus 101.

4. Modified Embodiments

The communication system according to the embodiment of the present invention is not limited to that described above, and may be provided in accordance with any other modified embodiments.

In the embodiment described above, a peer-to-peer communication is established between the mobile terminal apparatus 104 and the content distribution apparatus 105. However, communication apparatuses establishing a peer-to-peer communication are not limited to the combination of the mobile terminal apparatus 104 and the content distribution apparatus 105. For example, the content distribution apparatus may be any other communication apparatus. In addition, for example, both the communication apparatuses establishing the a peer-to-peer communication may be mobile terminal apparatuses or may be content distribution apparatuses.

In addition, the function of the NAT setting helper apparatus 102 and the function of the call apparatus 103 may be provided in different forms. At least one of the NAT setting helper apparatus 102 and the call apparatus 103 may be integrated with the setup server apparatus 101. For example, in the case where the setup server apparatus 101 has the function of the call apparatus 103, the messages M2 to M4 are omitted, and the setup server apparatus 101 can directly connect to the content distribution apparatus 105. In addition, for example, a different trigger may be used for the content distribution apparatus 105 to connect with the setup server apparatus 101. In addition, since the NAT setting helper apparatus 102 is required for the peer-to-peer connection, the NAT setting helper apparatus 102 may be omitted in the case of applying the embodiment described above to applications other than the peer-to-peer connection.

The present invention is not limited to these embodiments, and may be applicable to embodiments modified in an appropriate manner.

The embodiment described above relates to a method for establishing a connection between communication apparatuses, particularly over a network such as the Internet. The embodiment described above is applicable to a recorder, a player, and a mobile terminal apparatus.

According to one general aspect, a method for establishing a connection between communication apparatuses is provided, the communication apparatuses including first and second communication apparatuses, and the first and second communication apparatuses communicating with a server apparatus to establish the connection between the first and second communication apparatuses not through the server apparatus. The method includes establishing a first connection from the first communication apparatus to the server apparatus; establishing a second connection between the second communication apparatus and the server apparatus; exchanging information on features of the first and second communication apparatuses between the first and second communication apparatuses via the first and second connections; and disconnecting the first and second connections after exchanging the information on the features of the first and second communication apparatuses. Then, the method further includes acquiring information on settings of a communication environment of the first communication apparatus by the first communication apparatus; establishing a third connection from the first communication apparatus to the server apparatus after acquiring the information on the settings of the communication environment of the first communication apparatus; acquiring information on settings of a communication environment of the second communication apparatus by the second communication apparatus; and establishing a fourth connection from the second communication apparatus to the server apparatus after acquiring the information on the settings of the communication environment of the second communication apparatus. Then, the method further includes exchanging the information on the settings of the communication environments of the first and second communication apparatuses between the first and second communication apparatuses via the third and fourth connections; and establishing a fifth connection between the first and second communication apparatuses not through the server apparatus, based on the exchanged information on the settings of the communication environments of the first and second communication apparatuses.

In the method for establishing a connection between communication apparatuses, the information on the settings of the communication environment of each of the first and second communication apparatuses is information on settings of network address translation associated with the communication apparatus.

In the method for establishing a connection between communication apparatuses, the fifth connection is a peer-to-peer connection.

In the method for establishing a connection between communication apparatuses, the method further includes: generating a session ID by the server apparatus after establishing the first connection.

In the method for establishing a connection between communication apparatuses, the method further includes: transmitting the session ID from the server apparatus to the first and second communication apparatuses via the first and second connections, respectively, after establishing the first and second connections; transmitting the session ID from the first communication apparatus to the server apparatus via the third connection after establishing the third connection; transmitting the session ID from the second communication apparatus to the server apparatus via the fourth connection after establishing the fourth connection; and determining by the server apparatus whether or not to continue the communication, based on the session ID held by the server apparatus, the session ID transmitted from the first communication apparatus, and the session ID transmitted from the second communication apparatus.

In the method for establishing a connection between communication apparatuses, the method further includes, after exchanging the information on the settings of the communication environments of the first and second communication apparatuses: disconnecting the third and fourth connections; and deleting the session ID held by the server apparatus.

According to a further general aspect, a communication apparatus for communicating with a server apparatus to establish a connection with a target apparatus not through the server apparatus is provided. The communication apparatus is provided with a communication unit, a storage unit, and a controller. The controller establishes a first connection with the server apparatus using the communication unit, exchanges information on features of the communication apparatus with information on features of the target apparatus via the first connection, and stores the exchanged information on the features, in the storage unit, and disconnects the first connection using the communication unit, after exchanging the information on the features. Then, the controller acquires information on settings of a communication environment of the communication apparatus, and establishes a second connection with the server apparatus using the communication unit, after acquiring the information on the settings of the communication environment of the communication apparatus. Then, the controller exchanges the information on the settings of the communication environment of the communication apparatus with information on settings of a communication environment of the target apparatus via the second connection, and stores the exchanged information on the settings of the communication environments, in the storage unit, and establishes a third connection with the target apparatus not through the server apparatus using the communication unit, based on the exchanged information on the settings of the communication environments.

In the communication apparatus, the information on the settings of the communication environment of the communication apparatus is information on settings of network address translation associated with the communication apparatus.

In the communication apparatus, the third connection is a peer-to-peer connection.

According to a further general aspect, a server apparatus for communicating with first and second communication apparatuses to establish a connection between the first and second communication apparatuses not through the server apparatus is provided. The server apparatus is provided with a communication unit, a storage unit, and a controller. The controller establishes a first connection from the first communication apparatus to the server apparatus using the communication unit, establishes a second connection between the second communication apparatus and the server apparatus using the communication unit, relays information on features of the first and second communication apparatuses between the first and second communication apparatuses via the first and second connections, for exchanging the information on the features between the first and second communication apparatuses, and disconnects the first and second connections using the communication unit after relaying the information on the features. Then, the controller establishes a third connection from the first communication apparatus to the server apparatus using the communication unit, establishes a fourth connection from the second communication apparatus to the server apparatus using the communication unit, and relays information on settings of communication environments of the first and second communication apparatuses between the first and second communication apparatuses via the third and fourth connections, for exchanging the information on the settings of the communication environments between the first and second communication apparatuses.

In the server apparatus, after establishing the first connection, the controller generates a session ID, and stores the session ID in the storage unit.

In the server apparatus, the controller transmits the session ID to the first and second communication apparatuses via the first and second connections, respectively, after establishing the first and second connections, receives the session ID from the first communication apparatus via the third connection after establishing the third connection, receives the session ID from the second communication apparatus via the fourth connection after establishing the fourth connection, and determines whether or not to continue the communication, based on the session ID held by the storage unit, the session ID received from the first communication apparatus, and the session ID received from the second communication apparatus.

In the server apparatus, after relaying the information on the settings of the communication environments of the first and second communication apparatuses, the controller disconnects the third and fourth connections using the communication unit, and deletes the session ID held by the storage unit.

Although the present invention has been fully described in connection with the exemplary embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A method for establishing a connection between communication apparatuses, the communication apparatuses including first and second communication apparatuses, and the first and second communication apparatuses communicating with a server apparatus to establish the connection between the first and second communication apparatuses not through the server apparatus, the method comprising:
establishing a first connection from the first communication apparatus to the server apparatus;
generating a session ID by the server apparatus after establishing the first connection;
establishing a second connection between the second communication apparatus and the server apparatus;
exchanging information on features of the first and second communication apparatuses between the first and second communication apparatuses via the first and second connections;
transmitting the session ID from the server apparatus to the first and second communication apparatuses via the first and second connections, respectively, after establishing the first and second connections;
disconnecting the first and second connections by sending temporary disconnection requests from the server apparatus to the first and second communication apparatuses, respectively, after exchanging the information on the features of the first and second communication apparatuses and after transmitting the session ID from the server apparatus to the first and second communication apparatuses;
acquiring information on settings of a communication environment of the first communication apparatus by the first communication apparatus, during a period in which the first communication apparatus is not connected to the server apparatus after disconnecting the first connection;
establishing a third connection from the first communication apparatus to the server apparatus after disconnecting the first connection and after acquiring the information on the settings of the communication environment of the first communication apparatus;
transmitting the session ID from the first communication apparatus to the server apparatus via the third connection after establishing the third connection;
acquiring information on settings of a communication environment of the second communication apparatus by the second communication apparatus, during a period in which the second communication apparatus is not connected to the server apparatus after disconnecting the second connection;
establishing a fourth connection from the second communication apparatus to the server apparatus after disconnecting the second connection and after acquiring the information on the settings of the communication environment of the second communication apparatus;
transmitting the session ID from the second communication apparatus to the server apparatus via the fourth connection after establishing the fourth connection;
determining by the server apparatus whether or not to continue the communication, based on the session ID held by the server apparatus, the session ID transmitted from the first communication apparatus, and the session ID transmitted from the second communication apparatus;
exchanging the information on the settings of the communication environments of the first and second communication apparatuses between the first and second communication apparatuses via the third and fourth connections; and
establishing a fifth connection between the first and second communication apparatuses not through the server apparatus, based on the information on the settings of the communication environments of the first and second communication apparatuses exchanged via the third and fourth connections, wherein the fifth connection is a peer-to-peer connection.

2. The method for establishing a connection between communication apparatuses as claimed in claim 1, wherein the information on the settings of the communication environment of each of the first and second communication apparatuses is information on settings of network address translation associated with the communication apparatus.

3. The method for establishing a connection between communication apparatuses as claimed in claim 1, further comprising, after exchanging the information on the settings of the communication environments of the first and second communication apparatuses:
disconnecting the third and fourth connections; and
deleting the session ID held by the server apparatus.

4. A communication apparatus for communicating with a server apparatus to establish a connection with a target apparatus not through the server apparatus,
the communication apparatus comprising a communication unit, a storage unit, and a controller,
wherein the controller:
establishes a first connection with the server apparatus using the communication unit,
exchanges information on features of the communication apparatus with information on features of the target apparatus via the first connection, and stores the exchanged information on the features, in the storage unit,
receives a session ID from the server apparatus via the first connection, after establishing the first connection,
disconnects the first connection using the communication unit, after exchanging the information on the features and receiving a temporary disconnection request from the server apparatus and after receiving the session ID from the server apparatus,
acquires information on settings of a communication environment of the communication apparatus, during a period in which the communication apparatus is not connected to the server apparatus after disconnecting the first connection,
establishes a second connection with the server apparatus using the communication unit, after disconnecting the first connection and after acquiring the information on the settings of the communication environment of the communication apparatus,
transmitting the session ID to the server apparatus via the second connection after establishing the second connection;
exchanges the information on the settings of the communication environment of the communication apparatus with information on settings of a communication environment of the target apparatus via the second connection, and stores the exchanged information on the settings of the communication environments, in the storage unit, and
establishes a third connection with the target apparatus not through the server
apparatus using the communication unit based on the information on the settings of the communication environments exchanged via the second connection, wherein the third connection is a peer-to-peer connection.

5. The communication apparatus as claimed in claim 4,
wherein the information on the settings of the communication environment of the communication apparatus is information on settings of network address translation associated with the communication apparatus.

6. A server apparatus for communicating with first and second communication apparatuses to establish a connection between the first and second communication apparatuses not through the server apparatus,
the server apparatus comprising a communication unit, a storage unit, and a controller,
wherein the controller:
establishes a first connection from the first communication apparatus to the server apparatus using the communication unit,
after establishing the first connection, generates a session ID and stores the session ID in the storage unit;
establishes a second connection between the second communication apparatus and the server apparatus using the communication unit,
relays information on features of the first and second communication apparatuses between the first and second communication apparatuses via the first and second connections, for exchanging the information on the features between the first and second communication apparatuses,
transmits the session ID to the first and second communication apparatuses via the first and second connections, respectively, after establishing the first and second connections,
disconnects the first and second connections using the communication unit by
sending temporary disconnection requests to the first and second communication apparatuses, respectively, after relaying the information on the features and after
transmits the session ID to the first and second communication apparatuses, establishes a third connection from the first communication apparatus to the
server apparatus using the communication unit, after disconnecting the first connection,
receives the session ID from the first communication apparatus via the third
connection after establishing the third connection,
establishes a fourth connection from the second communication apparatus to the server apparatus using the communication unit, after disconnecting the second connection,
receives the session ID from the second communication apparatus via the fourth connection after establishing the fourth connection,
determines whether or not to continue the communication, based on the session ID held by the storage unit, the session ID received from the first communication apparatus, and the session ID received from the second communication apparatus, and
relays information on settings of communication environments of the first and second communication apparatuses between the first and second communication apparatuses via the third and fourth connections, for exchanging the information on the settings of the communication environments between the first and second communication apparatuses so that the first and second communication apparatuses can establish a peer-to-peer connection.

7. The server apparatus as claimed in claim 6, wherein after relaying the information on the settings of the communication environments of the first and second communication apparatuses, the controller disconnects the third and fourth connections using the communication unit, and deletes the session ID held by the storage unit.

* * * * *